(12) United States Patent
Imai et al.

(10) Patent No.: US 8,014,061 B2
(45) Date of Patent: Sep. 6, 2011

(54) VARIABLE-FOCAL LENGTH LENS

(75) Inventors: Tadayuki Imai, Atsugi (JP); Masahiro Sasaura, Atsugi (JP); Jun Miyazu, Atsugi (JP); Shogo Yagi, Atsugi (JP); Kazuo Fujiura, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 12/808,105

(22) PCT Filed: Dec. 26, 2008

(86) PCT No.: PCT/JP2008/073863
§ 371 (c)(1),
(2), (4) Date: Jun. 14, 2010

(87) PCT Pub. No.: WO2009/084692
PCT Pub. Date: Jul. 9, 2009

(65) Prior Publication Data
US 2010/0290104 A1    Nov. 18, 2010

(30) Foreign Application Priority Data
Dec. 28, 2007    (JP) .................. 2007-341067

(51) Int. Cl.
*G02F 1/29*    (2006.01)

(52) U.S. Cl. ........ 359/319; 359/301; 359/315; 359/316; 359/321; 359/245; 359/721

(58) Field of Classification Search .................. 359/228, 359/245, 301, 315, 319, 321, 322, 656, 676, 359/721; 396/72; 349/200; 369/44.26, 94, 369/100
See application file for complete search history.

(56) References Cited

U.S. PATENT DOCUMENTS

| | | | | |
|---|---|---|---|---|
| 2,936,380 A | * | 5/1960 | Anderson | 250/225 |
| 3,357,771 A | * | 12/1967 | Buhrer et al. | 359/316 |
| 3,460,884 A | * | 8/1969 | Heller | 359/315 |
| 4,181,399 A | * | 1/1980 | McMahon et al. | 385/16 |
| 5,020,885 A | * | 6/1991 | Shibaguchi | 359/301 |
| 5,124,835 A | * | 6/1992 | Shibaguchi et al. | 359/319 |
| 5,272,561 A | | 12/1993 | Shibaguchi | |
| 5,301,201 A | * | 4/1994 | Dutta et al. | 372/43.01 |

(Continued)

FOREIGN PATENT DOCUMENTS

JP    09-258150    3/1997

(Continued)

OTHER PUBLICATIONS

Notification of transmittal of translation of the international preliminary report on patentability dated Aug. 19, 2010 from International Application No. PCT/JP2008/073863.
Takuya Kaneko et al., *Optical Microscope Expanded Depth of Field Using Dynamic Focusing Lens for Micro Parts Assembling*, Denso Technical Review, vol. 3 No. 1 1998, pp. 52-58.

(Continued)

*Primary Examiner* — Loha Ben
(74) *Attorney, Agent, or Firm* — Workman Nydegger

(57) ABSTRACT

To provide a variable-focal length lens capable of altering its focal length at high speed. The variable-focal length lens has an electrooptic material and electrodes formed on an incident surface of light and on an exit surface of the light of the electrooptic material. An optical axis is set so that the light is inputted into a gap where the electrodes of the incident surface are not formed and is outputted from a gap where the electrodes of the exit surface are not formed. A focus of the light that is transmitted through the electrooptic material becomes variable by varying an applied voltage between the electrodes of the incident surface and the electrodes of the exit surface.

20 Claims, 7 Drawing Sheets

U.S. PATENT DOCUMENTS

| | | | |
|---|---|---|---|
| 5,786,926 A * | 7/1998 | Yamada | 359/250 |
| 6,859,333 B1 * | 2/2005 | Ren et al. | 359/721 |
| 7,206,121 B2 * | 4/2007 | Minami | 359/321 |
| 7,609,954 B2 * | 10/2009 | Feng et al. | 396/72 |
| 2001/0055145 A1 | 12/2001 | Hamada | |
| 2006/0051041 A1 | 3/2006 | Imai et al. | |
| 2009/0219378 A1 | 9/2009 | Nakamura et al. | |

FOREIGN PATENT DOCUMENTS

| | | |
|---|---|---|
| JP | H11-064817 | 3/1999 |
| JP | 2001-194690 | 7/2001 |
| JP | 2007-310104 | 11/2007 |
| JP | 2009-014793 | 1/2009 |
| WO | WO 2006/137408 | 12/2006 |

OTHER PUBLICATIONS

International Search Report for PCT/JP2008/073863, published Jul. 9, 2009.

International Preliminary Report on Patentability issued in counterpart PCT Application No. PCT/JP2008/073863 on Jul. 8, 2010.

Supplementary European Search Report dated Dec. 13, 2010 from corresponding European Application No. 08867509.5.

Chang et al., "*Liquid Crystal Lens Array*," IBM Technical Disclosure Bulletin, International Business Machines Corp., vol. 24, No. 4, Sep. 1, 1981, pp. 2030-2031.

Office Action from corresponding European Patent Application No. 08867509.5, dated Jun. 6, 2011.

\* cited by examiner

VARIABLE-FOCAL LENGTH LENS

TECHNICAL FIELD

The present invention relates to a variable-focal length lens, and more specifically, to a variable-focal length lens that is made alterable in focal length using an optical material having an electrooptic effect.

BACKGROUND ART

Conventionally, optical components, such as an optical lens and a prism, are used for optical apparatuses, such as a camera, a microscope, and a telescope, recording devices of an electrophotography system, such as a printer, and a copying apparatus, optical recording devices such as a DVD, and optical devices for communications and industries. Although focal lengths of usual optical lenses are fixed, some of the above-mentioned apparatuses and devices may use lenses whose focal lengths can be adjusted according to circumstances, i.e., so-called variable-focal length lenses. The conventional variable-focal length lens adjusts its focal length mechanically with a combination of a plurality of lenses. However, there was a limit in such a mechanical variable-focal length lens in extending its application range in terms of a response speed, manufacture costs, miniaturization, power consumption, etc.

Then, there have been devised a variable-focal length lens such that a material whose refractive index is variable is applied to a transparent medium that makes up an optical lens, variable-focal length lens whose shape of the optical lens is mechanically deformed, not moving a position of the optical lens, etc. As a former variable-focal length lens, the variable-focal length lens that uses a liquid crystal is proposed as an optical lens. This variable focal length lens confines a liquid crystal in a container made of a transparent material by sandwiching the liquid crystal with two glass plates or other ways. Because the inner side of this container is processed to be a spherical surface, the liquid crystal is formed in a lens shape and becomes a variable-focal length lens. Transparent electrodes are provided on the inside of this container. By applying an electric field to the liquid crystal, its refractive index is controlled, and a focal length invariably controlled (e.g., refer to Patent Document 1).

For the latter variable-focal length lens, a liquid is used in many cases as a material of a deforming lens. For example, the variable-focal length lens described in Nonpatent Document 1 has a structure that encloses a liquid, such as silicone oil, in a space sandwiched by glass plates. The glass plates are processed thin, and the lens constructed with oil and the whole glass plates is deformed by putting a pressure on the glass plates externally with a lead zirconate titanate (PZT) piezo actuator, and thereby a focusing position is controlled. An operating principal of this variable focal length lens is the same as that of the crystalline lens of the eyeball.

However, the conventional variable-focal length lenses, in any one of the variable-focal length lens that mechanically adjusts its focal length, the variable-focal length lens that controls the refractive index by applying an electric field to a liquid crystal, and variable-focal length lens that deforms a lens by a PZT piezo actuator, have a problem that there is a limit in response speed needed to alter their focal lengths, and thereby each is inapplicable to a high-speed response of 1 ms or less.

The object of the present invention is to provide a variable-focal length lens capable of altering its focal length at high speed.

[Patent Citation 1] Japanese Patent Laid-open No. H11-64817 (1999)

[Non patent Citation 1] Takuya KANEKO, "Optical Microscope Expanded Depth of Field using Dynamic Focusing Lens for Micro Parts Assembling", Denso Technical Review, Vol. 3, No. 1, pp. 52-58, 1998.

DISCLOSURE OF THE INVENTION

In order to attain such an object purpose, one embodiment of the present invention has an electrooptic material made up of a single crystal having inversion symmetry, the electrooptic material having an incident surface of light and an opposing exit surface of light. Electrodes are formed on the incident surface of light of the electrooptic material and on the exit surface thereof, wherein an thereof. An optical axis is set so that the light is inputted into a portion of the incident surface on which the electrodes of the incident surface are not formed, is transmitted through the electrooptic material, and is outputted from a portion of the exit surface on which the electrodes of the exit surface are not formed, wherein a part of an electric line of force connecting the electrodes of the incident surface and the electrodes of the exit surface bends in a portion of the electrooptic material sandwiched between the portion of the incident surface and the portion of the exit surface so that an electric field of a portion of the electrooptic material through which the light is transmitted centering on the optical axis is made to vary, and wherein a focus of the light transmitted through the electrooptic material is variable by varying an applied voltage between the electrodes of the incident surface and the electrodes of the exit surface.

Perovskite type single crystal materials are suitable for the above-mentioned electrooptic material, and potassium tantalate niobate ($KTa_{1-x}Nb_xO_3$) can be typically used for it. Moreover, each of the above-mentioned electrooptic materials is a crystal whose principal component consists of an element of the Ia family of the periodic table and an element of the Va family, the element of the Ia family is potassium, and the element of the Va family can include at least one of niobium and tantalum. Further the material can include, as an added impurity, elements of the Ia family of the periodic table except potassium, for example, lithium and also include one or a plurality of elements of the IIa family.

It is desirable that in a pair of electrodes of the incident surface and a pair of electrodes of the exit surface, sides that oppose each other sandwiching the gap are arranged in parallel to each other, respectively. Furthermore, it is desirable that the opposing sides of the electrodes of the incident surface and the opposing sides of the electrodes of the exit surface that oppose the former opposing sides sandwiching the electrooptic material are arranged in parallel to each other, respectively.

BEST MODE FOR CARRYING OUT THE INVENTION

Hereafter, embodiments of the present invention will be described in detail referring to drawings. A variable-focal length lens of this embodiment consists of an electrooptic material and electrodes attached to this. By using the electrooptic effect, far high-speed response speed can be obtained as compared with the conventional variable-focal length lenses.

Figure 1:
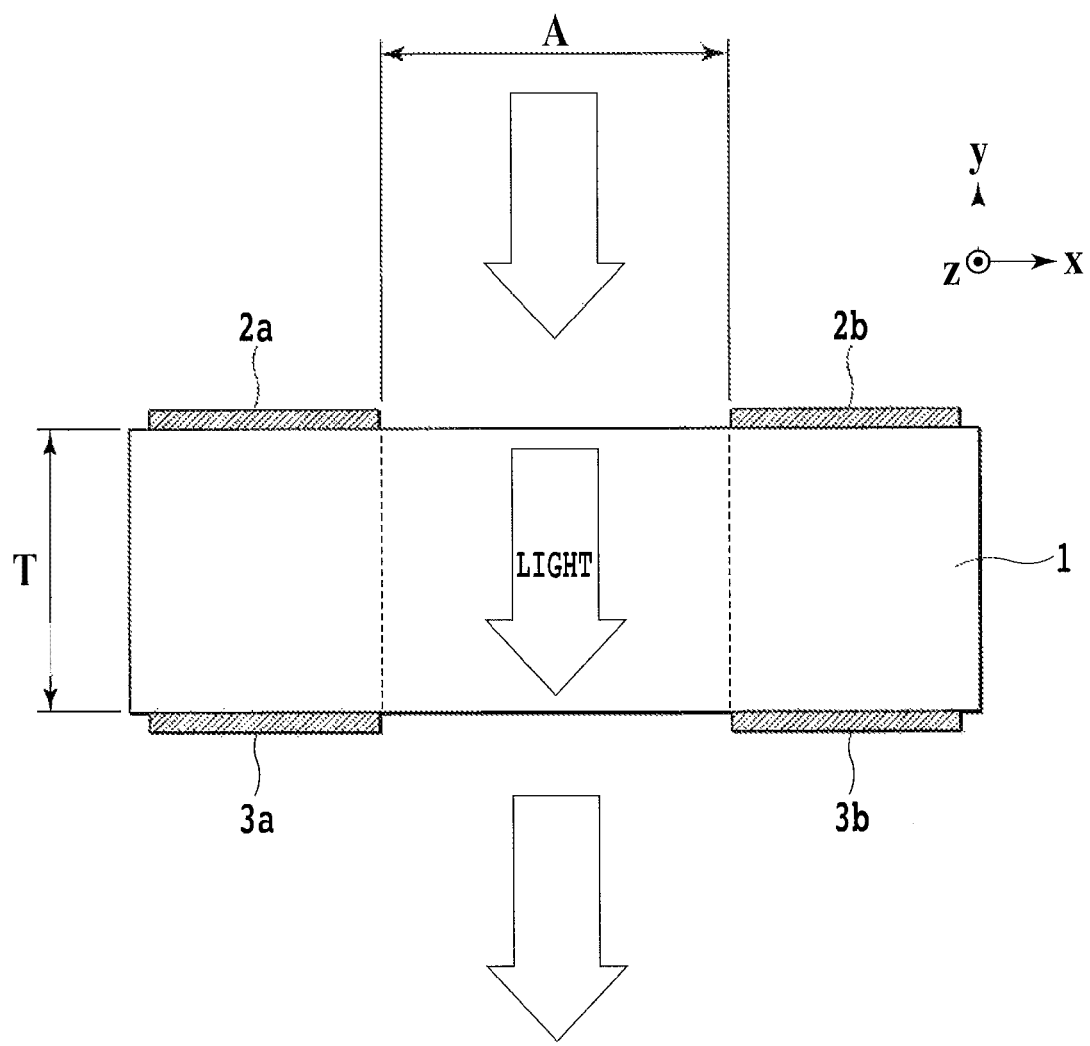
FIG. 1 is a diagram showing a configuration of a variable-focal length lens according to one embodiment of the present invention.

FIG. 1 shows a configuration of the variable-focal length lens according to one embodiment of the present invention. One pair of upper electrodes $2a$, $2b$ and one pair of lower electrodes $3a$, $3b$ are formed on a top surface (incident surface of the light) and on an undersurface (exit surface of the light) of a substrate 1 that is an electrooptic material formed into a plate, respectively. Each of the upper electrodes $2a$, $2b$ is set to an equal electric potential, 2nd each of the lower electrodes $3a$, $3b$ is set to an equal electric potential, respectively. An optical axis is set in a y-axis direction so that the light may pass through a gap between the electrode pair of the same electric potential. The upper electrodes $2a$, $2b$ are formed so that their sides that oppose each other sandwiching the gap at which the light is transmitted may become parallel to the z-axis, and a spacing of these two sides is designated by A. The lower electrodes $3a$, $3b$ are also of the same configuration, and the positions of the opposing sides correspond to those of the opposing sides of the upper electrodes $2a$, $2b$ in an x-axis direction, that is, the former and the latter correspond to each other sandwiching the substrate 1. Here, the thickness of the substrate 1 is designated by T. The voltage can be applied from the upper electrodes $2a$, $2b$ to the lower electrodes $3a$ $3b$ and vice versa.

Oxide single crystal materials that have inversion symmetry are suitable for the electrooptic material. The inversion symmetry will be descried later in detail. The electrodes will also be described later in detail.

Figure 2:
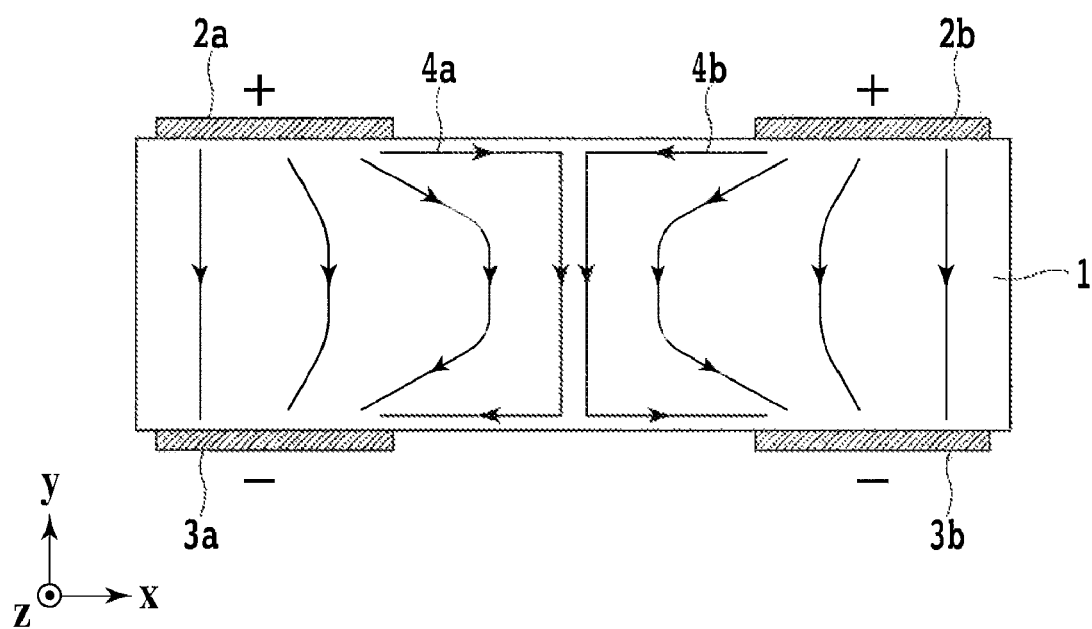
FIG. 2 is a diagram for explaining a principle of the variable focal length lens according to this embodiment.

With reference to FIG. 2, a principle of the variable-focal length lens according to this embodiment will be explained. In the variable-focal length lens shown in FIG. 1, a positive voltage is applied to the upper electrodes $2a$, $2b$ and a negative voltage is applied to the lower electrodes $3a$, $3b$. At this time, like a usual capacitor, an electric field is generated between the electrodes that face each other vertically in a state of directing from the top to the bottom. Moreover, the electric field is generated not only between the upper and lower electrodes but also in their surroundings, and is also generated in a portion through which the light is transmitted. This electric field that protrudes from between the upper and lower electrodes generates a refractive index modulation in the portion through which the light is transmitted, because of the electrooptic effect in the substrate 1 made of the electrooptic material.

An electric field distribution of the portion through which the light is transmitted and refractive index modulation thereof will be explained. The electrooptic material generally has a relative dielectric constant sufficiently larger than 1. For this reason, the electric line of force in the interior of the substrate 1 becomes nearly parallel to the substrate surface near the surface (refer to signs of $4a$, $4b$). An electric line of force $4a$ that proceeds rightward from the upper electrode $2a$ advances almost in parallel to the top surface of the substrate 1, as it is, after coming out of the upper electrode $2a$. On the other hand, an electric line of force $4b$ that proceeds leftward from the upper electrode $2b$ also advances almost in parallel to the top surface of the substrate 1, as it is, after coming out of the upper electrode $2b$. Since the two electric lines of force $4a$, $4b$ collide in a central part between the upper electrode pair $2a$, $2b$, they change their directions largely there and proceeds to the lower part of the substrate 1. The electric lines of force $4a$, $4b$ arrive at the undersurface after that, change their directions largely, advance to mutually opposite directions, and reach up to the lower electrodes $3a$, $3b$, respectively. In this way, since the electric line of force that proceeds near the surface is sharply bent in the gap between the electrode pair of the same electric potential in the interior of the substrate 1, the electric field changes largely in this bending portion. That is, the electric field varies largely in the portion through which the light is transmitted centering on the optical axis and the refractive index is also largely modulated.

Figure 3:
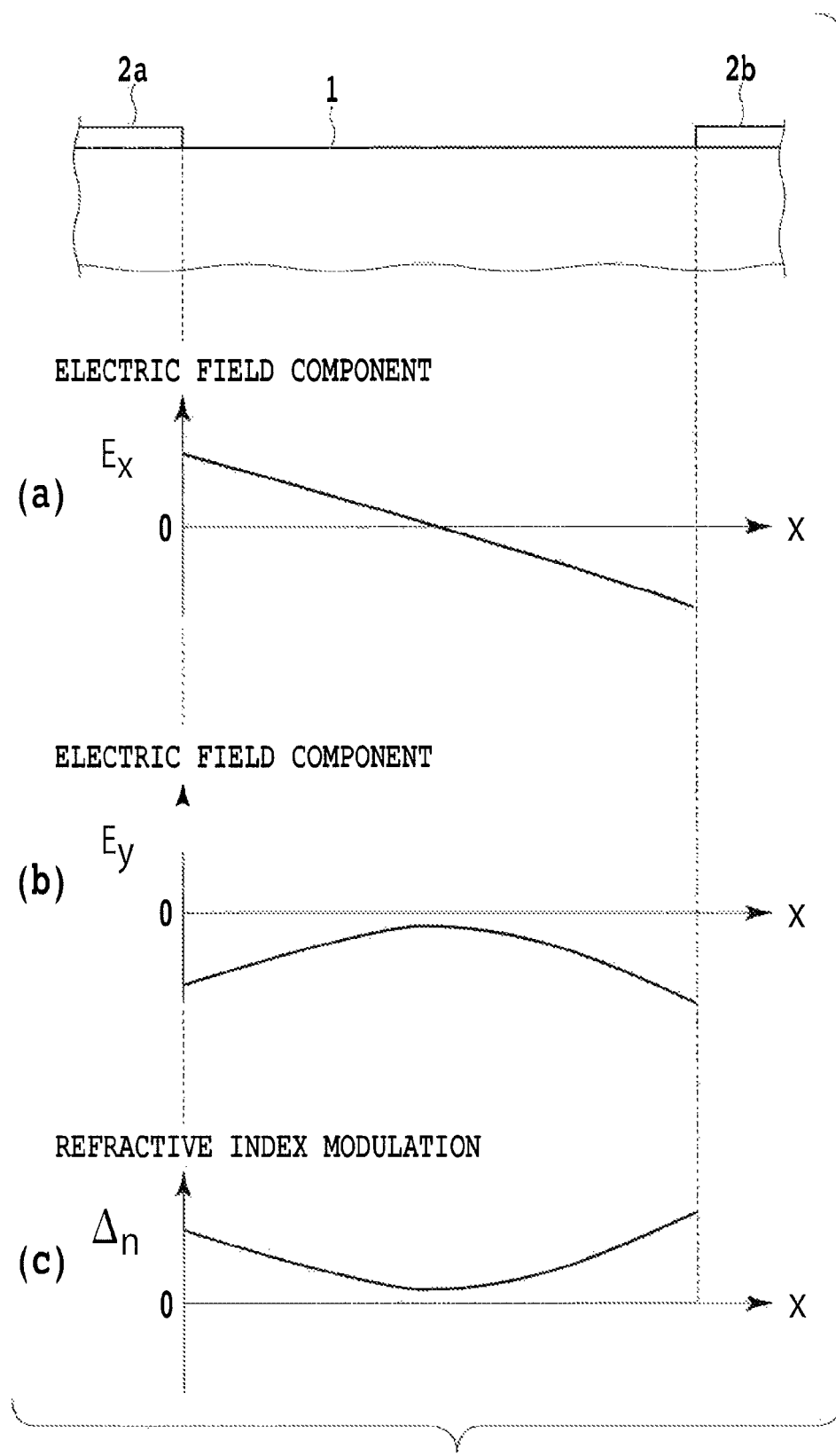
FIG. 3 is a diagram showing an electric field component and a distribution of a refractive index in the interior of a substrate of the variable-focal length lens.

FIG. 3 shows an electric field component and a distribution of refractive index in the interior of the substrate. FIG. 3($a$) shows a distribution of the electric field component Ex in the x-axis direction near the top surface of the substrate 1. A horizontal axis represents a position in the x-axis direction of a portion that exists between the electrode pair of the same electric potential and through which the light is transmitted. Since in a left part and in a right part, the direction of the electric line of force changes by 180° at the central part as a boundary, the distribution becomes like this. Similarly, FIG. 3($b$) shows a distribution of an electric field component Ey in the y-axis direction at respective positions in the x-axis direction. Although the electric field component Ey does not change its sign, its absolute value is small in the central part and becomes larger as the position approaches the electrode. The refractive index in the x-axis direction is modulated by such an electric field distribution.

FIG. 3($c$) shows the refractive index modulation when the light is inputted into the electrooptic material made of potassium tantalite niobate ($KTa_{1-x}Nb_xO_3$, hereinafter referred to as KTN) and a direction of the electric field of the light is in a z-axis direction. Since the refractive index in the central part of the substrate 1, i.e., the vicinity of the optical axis, is lower than the refractive index in portions near the electrodes which are away from the central part in the x-axis direction, the light travels at high speed. And the speed of the light becomes slower in a portion closer to the electrodes which are away from the central part. For this reason, the wave front of the light that was transmitted through the substrate 1 have a shape that is behind in a part near the electrode pair than in the central part and its vicinity, and thereby it functions as a concave lens. Considering the portion through which the light is transmitted as a lens, it is possible to realize a lens that has a strong effect of convergence or divergence. With the configuration of FIG. 1 and FIG. 2, since convergence or divergence of the light occurs only in the x-axis direction and neither convergence nor divergence occurs in the z-axis direction, the lens functions as a so-called cylindrical lens, not as a common spherical lens.

Another one lens with the configuration of FIG. 1 and FIG. 2 is prepared, the two lenses are arranged with optical axes of portions through which the light is transmitted being coincided with each other and one of lense is rotated by 90° to the other lense about their optical axes. This pair of lenses can realize a function equivalent to that of the spherical lens because it converges or diverges the light in two directions.

(Electrooptic Material)

Although the electrooptic effect includes a few electrooptic effects that are different in order, usually the first-order electrooptic effect (hereinafter referred to as the Pockels effect) and the second-order electrooptic effect (hereinafter referred to as the Kerr effect) are being used. However, among the electrooptic effects, materials each having the second-order electrooptic effect (Kerr effect) that produces the refractive index modulation in proportion to a squared electric field are suitable. This is because that in the case of the Kerr effect, since the refractive index distribution Δn is not dependent on a sign of the electric field component Ex as shown in FIG. 3, the distribution becomes a bilateral symmetry that is suitable as a lens. On the other hand, in the case of the Pockels effect, the refractive index modulation is proportional to the first power of the electric field, and the refractive index variation caused by the electric field component Ex does not exhibit a bilateral symmetry, and therefore it does not function well as a lens.

Moreover, the single crystal that has the inversion symmetry refers to a crystal such that if the arrangement of the atoms are inverted about a certain origin in an x, y, and z coordinate system, the inverted arrangement will have completely the same arrangement as the original arrangement of atoms. Incidentally, if a material having spontaneous polarization is inverted on the coordinate axes, a direction of the spontaneous polarization will be inverted, and therefore such a crystalline material does not have the inversion symmetry. On the other hand, the single crystal having the inversion symmetry does not have the Pockels effect but has the Kerr effect, which is the lowest order electrooptic effect thereof. Therefore, the single crystal having the inversion symmetry is preferable among the crystalline materials that have the electrooptic effects.

The magnitude of the electric field in the interior of the crystal is proportional to the voltage applied to the electrode. Moreover, since the refractive index modulation is proportional to the square of the electric field, the magnitude of the refractive index modulation is proportional to the square of the voltage after all. Thereby, the focal length of the concave lens is controllable by the voltage. Moreover, although it was explained that it functioned as the concave lens here, a convex lens is also realizable because a sign of an electrooptic coefficient changes with a material and a light polarization.

As the electrooptic materials, single crystal materials that each have a perovskite type crystal structure are suitable. This is because if a operating temperature is properly selected, the structure of the perovskite type single crystal material becomes cubic, and has the inversion symmetry. The perovskite type single crystal material with this cubic phase does not have the Pockels effect. For example, also wellknown barium titanate ($BaTiO_3$, hereinafter referred to as BT) with the cubic phase exhibits the Kerr effect if it is at a operating temperature exceeding a temperature at which a phase transition from tetragonal phase to cubic phase (hereinafter referred to as a phase transition temperature) takes place near 120° C.

Furthermore, the single crystal material that is made up of KTN as a principal component has a more suitable characteristic. While BT has the fixed phase transition temperature, KTN can select the phase transition temperature by a composition ratio of tantalum and niobium. Thereby, the phase transition temperature can be set near the room temperature. If the operating temperature is a temperature higher than the phase transition temperature, the structure of KTN becomes the cubic and has the inversion symmetry, and KTN exhibits a large Kerr effect. Even if it is in the same cubic phase, one in the operating temperature nearer the phase transition temperature will come to exhibit an overwhelmingly larger Kerr effect than others. For this reason, it is extremely important to set the phase transition temperature near the room temperature in order to realize a large Kerr effect handily.

As the single crystal material having the inversion symmetry, there can be used a material such that a principal component of its crystal consists of elements of the Ia family and the Va family of the periodic table, wherein the Ia family is potassium and the Va family element includes at least one of niobium and tantalum. Furthermore, it can include, as an added impurity, an element of the Ia family of the periodic table except potassium, for example, lithium or one or a plurality of elements of the IIa family. For example, potassium lithium tantalate niobate (KLTN; $K_{1-y}Li_yTa_{1-x}Nb_xO_3$, $0<x<1$, $0<y<1$) crystal with the cubic phase has a large Kerr effect can also be used.

In KTN, if the operating temperature is brought close to the phase transition temperature, the dielectric constant will become high rapidly, and thereby the electrooptic effect becomes large. Moreover, if the dielectric constant is high, bending of the electric line of force shown in FIG. 2 will become more rapid, and a lens effect will become large. If the relative dielectric constant of KTN exceeds 10,000 and the voltage applied to KlN substrate exceeds 500 V, for example, by a synergistic effect of a combination of a large electrooptic effect and a large bending of the electric line of force, the focal length will become less than or equal to 1 m, and a practically effective characteristic will be obtained.

Incidentally, in the case of KlN, similarly with other electrooptic crystals, its refractive index modulation changes by a relationship between a direction of the applied electric field and a direction of the optical electric field. In the configuration of FIG. 2, polarized light has two kinds of polarization, one that has the direction of the optical electric field lying in the x-axis direction, and the other that has the direction of the optical electric field lying in the z-axis direction. In the respective cases, the refractive index modulation $\Delta n_x$ and $\Delta n_z$ that The light senses are expressed by the following formulae:

$$\Delta n_x = -\frac{1}{2}n_0^3(s_{11}E_x^2 + s_{12}E_y^2) \quad \text{[Formulae 1]}$$

$$\Delta n_z = -\frac{1}{2}n_0^3(s_{12}E_x^2 + s_{12}E_y^2),$$

which differ from each other. Here, $n_0$ is a refractive index before the modulation.

Moreover, $s_{11}$ and $s_{12}$ are the electrooptic coefficients: while $s_{11}$ has a positive value, $s_{12}$ has a negative value, and $s_{11}$ is larger than $s_{12}$ in absolute value. Because of this characteristic, the lens changes its function completely: while in the case where the direction of the optical electric field is in the x-axis direction, the lens functions as the convex lens, in the case of the z-axis direction, it functions as the concave lens.

(Electrode Material)

If a high voltage is applied to the electrooptic material, electric charges are injected from the electrode and may generates space charges inside its crystal. Since these spatial charges generate an inclination of the electric field in a voltage applying direction, an inclination is also generated in the refractive index modulation.

To prevent refractive index distributions that are undesired for making the electrooptic material function as a lens and to prevent deflections of the light transmitted through the electrooptic material, it is better not to form space charges in the interior of the substrate 1 when the voltage is applied to the substrate 1. Since the quantity of space charges depends on the injection efficiency of the carrier, a smaller injection efficiency of the carrier injected from the electrode is desirable. As the work function of the electrode material becomes larger, a state between the electrode and the substrate becomes closer to the Schottky junction and the injection efficiency of the carrier decreases. In the electrooptic crystal, in the case where the carrier contributing to electrical conduction is an electron, it is desirable that the work function of the electrode material is more than or equal to 5.0 eV. For example, as electrode materials whose work functions are more than or equal to 5.0 eV, Co (5.0), Ge (5.0), Au (5.1), Pd (5.12), Ni (5.15), Ir (5.27), Pt (5.65), and Se (5.9) can be used. Inside the parenthesis "( )" shown is the work function (eV).

On the other hand, in the case where the carriers contributing to electrical conduction are positive holes in the electrooptic crystal, it is desirable that the work function of the electrode material is less than 5.0 eV in order to suppress injection of positive holes. For example, as an electrode material having a work function of less than or equal to 5.0 eV, Ti (3.84) etc. can be used. Incidentally, since a single layer electrode of Ti is oxidized to become high resistance, generally a layer of Ti and the electrooptic crystal are made to form a junction using an electrode that Ti/Pt/Au are layered. Furthermore, a transparent electrode, such as ITO (Indium Tin Oxide) and ZnO, can also be used.

FIRST EXAMPLE

Figure 4:
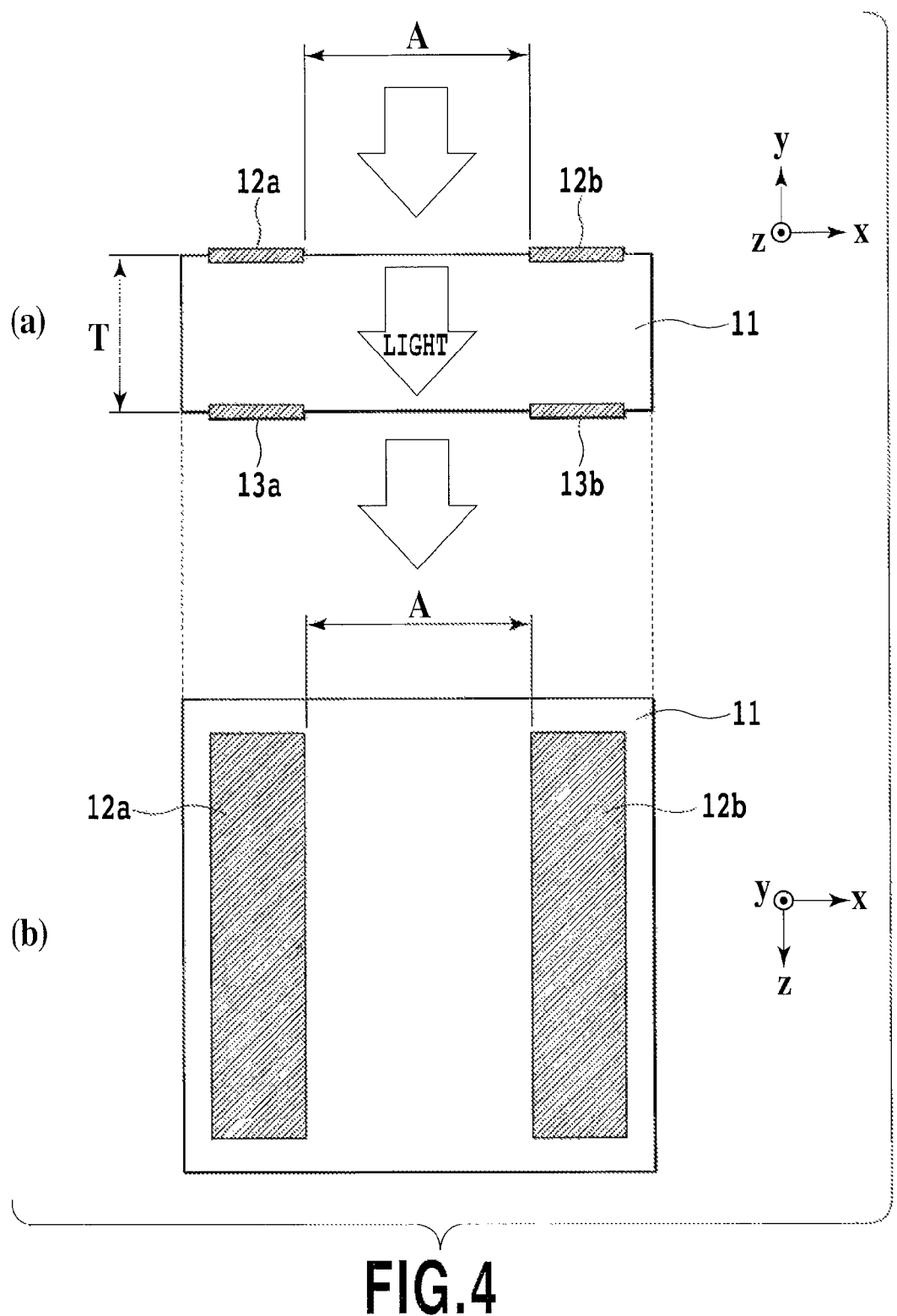
FIG. 4 is a diagram showing a configuration of a variable-focal length lens according to a first example.

FIG. 4 shows a configuration of a variable-focal length lens according to a first example. One pair of upper electrodes 12a, 12b and one pair of lower electrodes 13a, 13b are formed on a top surface and on an undersurface of a substrate 11 that is an electrooptic material formed into a plate, respectively. The substrate 11 is one that was cut out from a KTN single crystal as a block and was formed into a shape of 3 mm×3 mm× (thickness T=) 1 mm. All six planes of the substrate 11 were made parallel to the (100) plane of the crystal, and were subjected to optical polishing. Since this KTN single crystal has a phase transition temperature of 35° C., it was presupposed that this was used at 40° C. that exceeds this temperature slightly. The relative dielectric constant at this temperature is 20,000.

Each of the upper electrodes 12a, 12b and the lower electrodes 13a, 13b are a rectangle of 0.6 mm×2.6 mm, which is formed by evaporating platinum (Pt). In addition, sides that oppose each other sandwiching the gap at which the light is transmitted are arranged in parallel and a spacing A between these two sides is 1.4 mm.

In a state where the variable focal length lens of the first example is temperature controlled at 40° C., a collimated laser beam is inputted into the gap between the upper electrodes 12a, 12b. Polarization of the light is a linear polarization and a direction of a vibrating electric field is the z-axis direction. When a voltage of 500V is applied between the upper and lower electrodes, the light emitted from between the lower electrodes 13a, 13b broadens in the x-axis direction, and the lens functions as the cylindrical concave lens. The focal length is 25 cm. Here, if an applied voltage is set to 250 V, broadening will become smaller and the focal length will become about 1 m. That is, the focal length can be made to vary by changing the applied voltage. Since only the applied voltage needs to be changed in order to alter the focal length, a response time is less than or equal to 1 μs and is improved by three orders of magnitude or more as compared with the response time of the conventional variable-focal length lenses.

Moreover, a measurement is done with the polarization light being rotated by 90° and with the direction of travel of the light held as it is. That is, the direction of the vibrating electric field of the light is set as the x-axis direction. In this case, the lens functions as the convex lens. When the applied voltage is 500 V, the focal length is 19 cm and it is possible to vary the focal length by changing the applied voltage.

SECOND EXAMPLE

The characteristic of a lens is expressed by the optical path length modulation that the light receives by passing through the substrate 1. The optical path length modulation stands for an integration of the refractive index modulation Δn over a path on which the light is transmitted through the electrooptic material. As described above, since the refractive index modulation is a function of x and y, it is designated by Δn (x, y). The refractive index modulation Δn does not depend on z. Since in the variable-focal length lens according to this embodiment, the light propagates in the y-axis direction, the optical path length modulation Δs is expressed by:

$$\Delta s = \int \Delta n(x,y) dy,$$ [Formula 2]

which is a function of only x, not being dependent on y. That is, the refractive index modulation Δn varies only in the x-axis direction along which the light is converged or diverged, and does not vary in the z-axis direction.

Figure 5A:
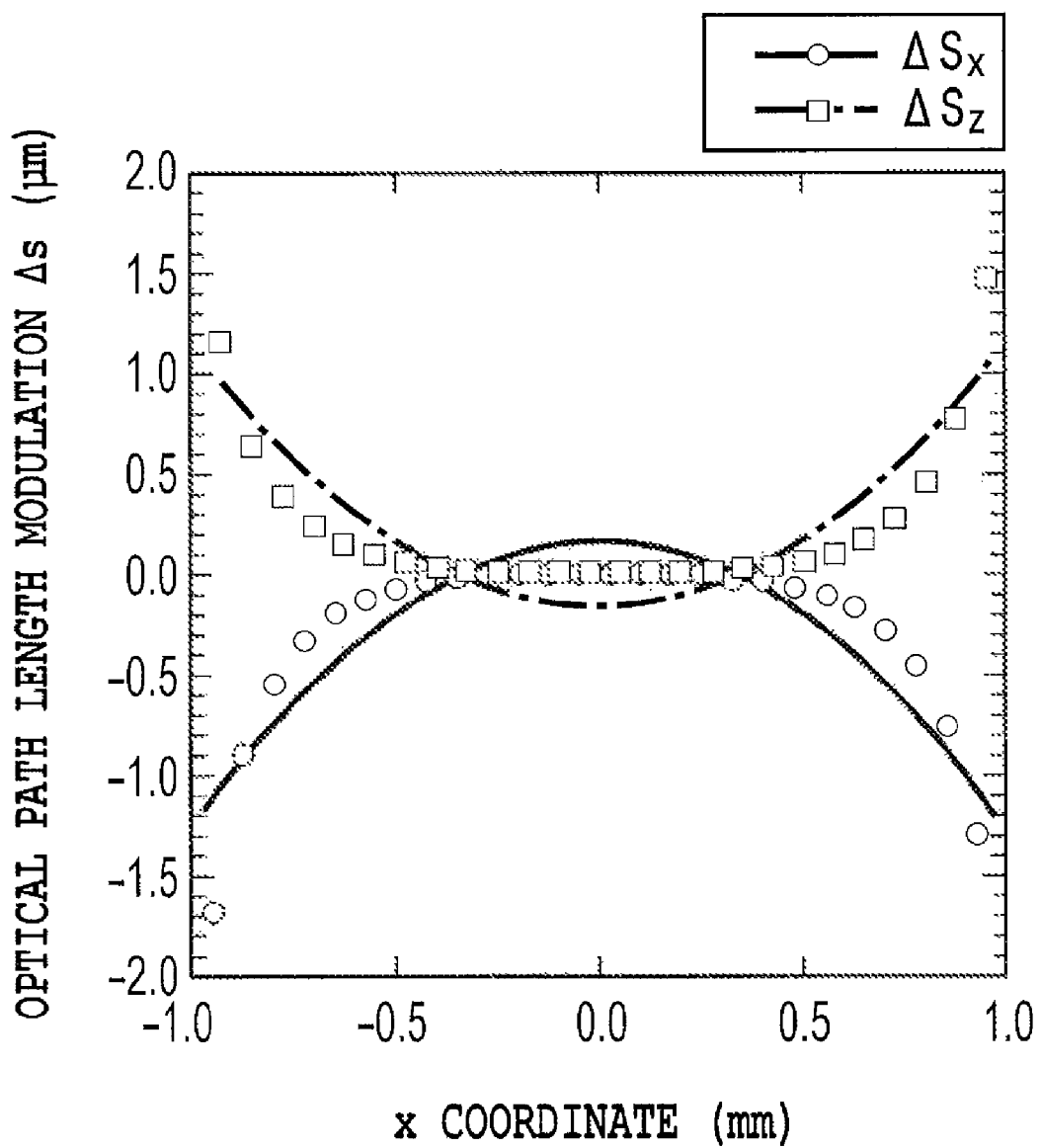
FIG. 5A is a diagram showing an optical path length modulation distribution of a variable-focal length lens according to a second example.
Figure 5B:
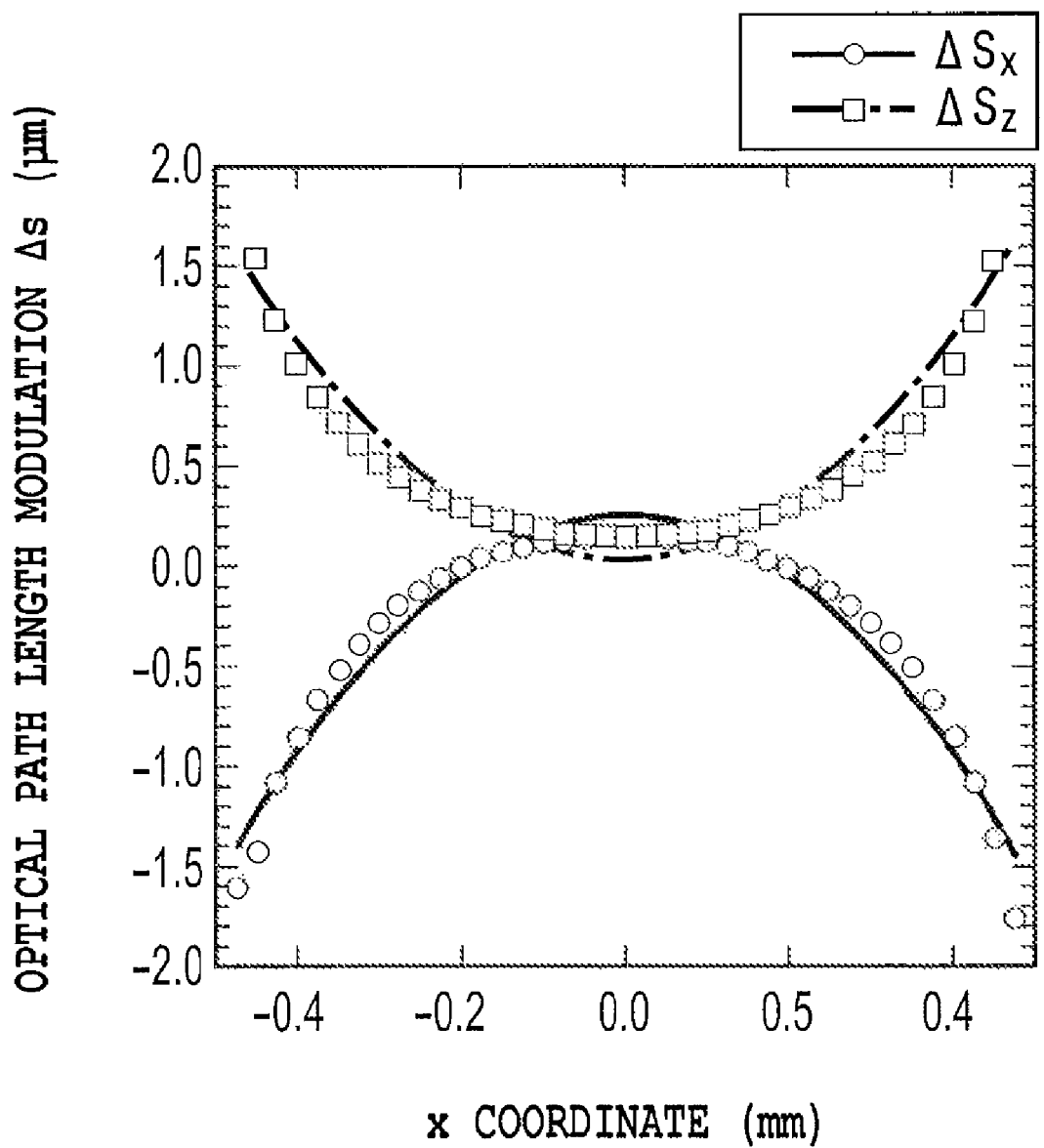
FIG. 5B is a diagram, showing the optical path length modulation distribution of the variable-focal length lens according to the second example.

FIGS. 5A, 5B shows optical path length modulation distributions of the variable-focal length lens according to a second example. FIG. 5A shows the optical path length modulation distribution in the case of a spacing between the upper electrodes and the lower electrodes A=2 mm; FIG. 5B shows the optical path length modulation distribution in the case of a spacing A=1 mm. In either case, the substrate 1 uses the electrooptic material of thickness T=1 mm. The horizontal axis represents a position in the x-axis direction, and designates the center of the portion through which the light is transmitted by an origin. A vertical axis represents an optical path length modulation Δs. In either case, the optical path length modulation (ΔSx) when the optical electric field points to the x-axis direction are convex upward, indicating that it functions as a convex lens. Incidentally, an optical path length modulation (ΔSz) in the case where the optical electric field points to the z-axis direction is convex downward, indicating that it functions as a concave lens.

Curves of FIGS. 5A, 5B show results of curve fitting to the quadratic curves. Although it is preferable that the modulation distributions ideally follow these quadratic curves, in either case, a slight deviation exists. Furthermore, FIG. 5A has large deviation from the quadratic curves as compared with FIG. 5B. This is because the electric line of force that spreads to the portion through which the light is transmitted from the each electrode spreads only in a range determined by the thickness T of the substrate 1. Therefore, when the same voltage is applied between the upper electrodes and the lower electrodes respectively, if the spacing A of the upper electrodes and of the lower electrodes are too wide (case in FIG. 5A), the electric line of force does not reach up to the center of the portion through which the light is transmitted, the electrooptic effect becomes small, and the refractive index modulation also becomes small.

Figure 6:
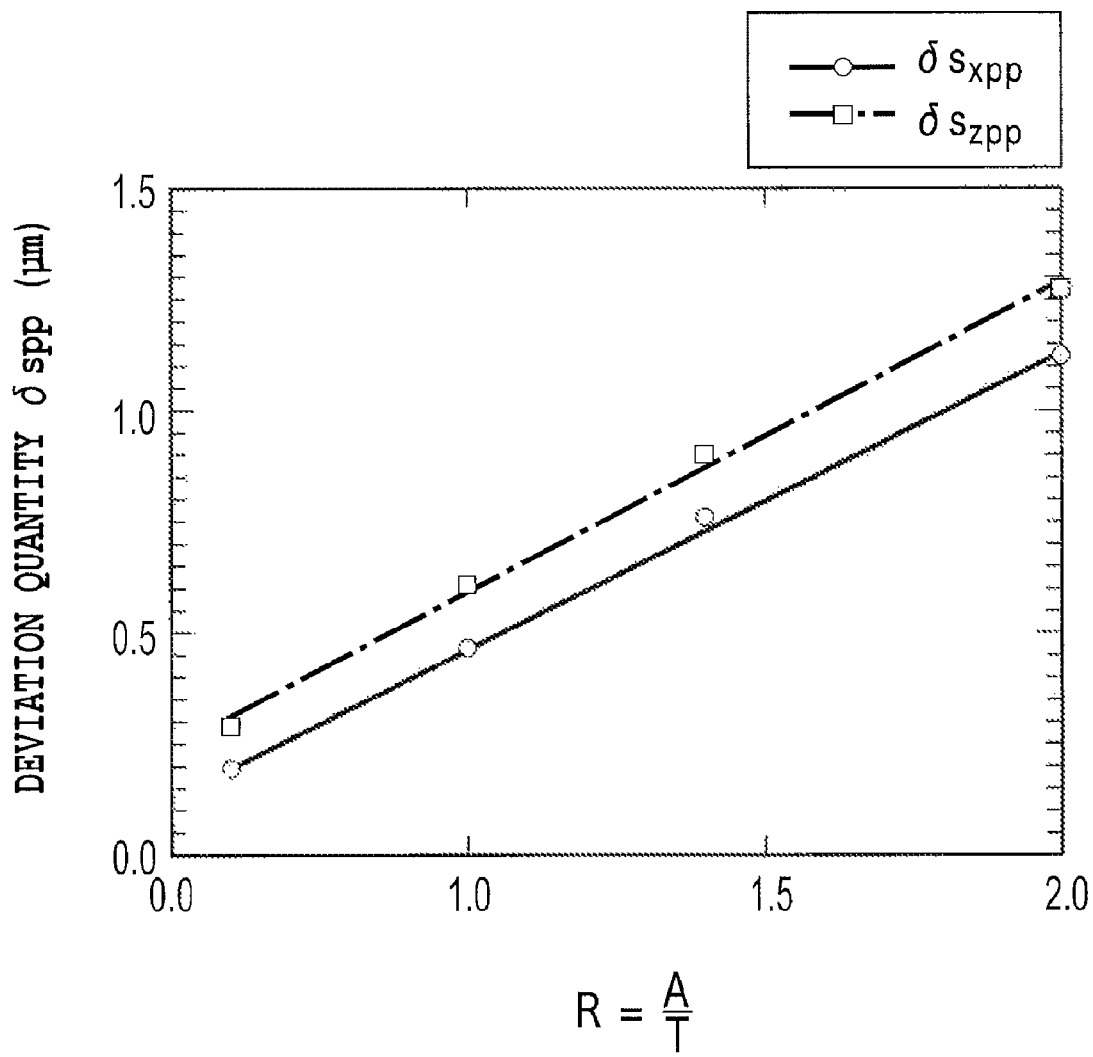
FIG. 6 is a diagram showing deviation each of which is between optical path length modulation and an ideal quadratic curve in the variable-focal length lens according to the second example.

FIG. 6 shows deviation between the optical path length modulations and ideal quadratic curves in the variable-focal length lens according to the second example. The horizontal axis represents a ratio R (=A/T) of the spacing A of the gap between the electrode pair and the thickness T of the substrate 1. The vertical axis represents a peak-to-peak value of a deviation quantity of the actual optical path length modulation Δs from the ideal quadratic curve. That is, the spacing A and the thickness T are fixed, the actual optical path length modulation (FIG. 5A, plots of open circle and open square) are numerically calculated, curve fittings shown in FIGS. 5A, 5B are performed, a minimum value and a maximum value of the deviation quantity are found over a range of the spacing A of the gap in x coordinates, and their fluctuation is found and shown as the peak-to-peak value. Since if the R is large, the electric line of force will not reach up to the center of the portion through which the light is transmitted, and the deviation quantity of the optical path length modulation Δs will become large, it is preferable that the R is set somewhat small. Practically, since a standard of the amount of deviation of the optical path length modulation Δs is about a light wavelength (approximately 1 μm), it is preferable to set R to 1.5 or less.

In the above-mentioned first example, although the upper electrodes 12a, 12b are shown as independent electrodes, respectively, unless unnecessary disturbance is given to the electric field distribution in the interior of the substrate 11, they may be a single electrode obtained by the two electrodes being connected on the top surface of the substrate 11 or being connected by other methods. Similarly, the lower electrodes 13a, 13b may also be one combined electrode, unless the unnecessary disturbance is given to the electric field distribution in the interior of the substrate 11.

In the above-mentioned first example, although the opposing sides of the upper electrodes 12a, 12b and those of the lower electrodes 13a, 13b correspond to each other sandwiching the substrate 11 in the x-axis direction, complete alignment is not necessary but only mutual parallelism is required.

In the above-mentioned examples, although the upper electrodes and the lower electrodes were shown as rectangles, they may be in arbitrary shapes except the sides that oppose each other sandwiching the gap at which the light is transmitted because that shape does not affect a lens action. Furthermore, in a location that is away from an extension of the area at which the light is transmitted by the same amount of the spacing A of the electrodes or the thickness T of the substrate or more in the z-axis direction, the electrodes may be in an arbitrary shape even when they are the sides that oppose each other sandwiching the gap.

The invention claimed is:

1. A variable-focal length lens, comprising:
an electrooptic material made up of a single crystal having inversion symmetry, the electrooptic material having an incident surface of light and an opposing exit surface of light; and
electrodes formed on the incident surface of light and on the exit surface of light of the electrooptic material,
wherein an optical axis is set so that the light inputted into a portion of the incident surface where the electrodes of the incident surface are not formed, is transmitted through the electrooptic material, and is outputted from a portion of the exit surface where the electrodes of the exit surface are not formed,
wherein a part of an electrical field line connecting the electrodes of the incident surface and the electrodes of the exit surface bends in a portion of the electrooptic material sandwiched between the portion of the incident surface and the portion of the exit surface so that an electric field of a portion of the electrooptic material through which the light is transmitted centering on the optical axis is made to vary, and
wherein a focus of the light transmitted through the electrooptic material is variable by varying an applied voltage between the electrodes of the incident surface and the electrodes of the exit surface.

2. The variable-focal length lens according to claim 1, wherein the electrooptic material is a perovskite type single crystal material.

3. The variable-focal length lens according to claim 2, wherein the electrooptic material is potassium tantalate niobate ($KTa_{1-x}Nb_xO_3$).

4. The variable-focal length lens according to claim 3, wherein the electrodes of the incident surface and the electrodes of the exit surface are made up of a material that forms the Schottky junction with the electrooptic material.

5. The variable-focal length lens according to claim 3, wherein sides of the electrodes of the incident surface that oppose each other across the portion of the incident surface are arranged in parallel, and sides of the electrodes of the exit surface that oppose each other across the portion of the exit surface are arranged in parallel.

6. The variable-focal length lens according to claim 2, wherein the electrooptic material is a crystal whose principal component consists of an element of the Ia family of the periodic table and an element of the Va family, and the element of the Ia family is potassium and the element of the Va family includes at least one of niobium and tantalum.

7. The variable-focal length lens according to claim 6, wherein the electrooptic material further includes, as an added impurity, an element of the Ia family of the periodic table except potassium, or one or a plurality of elements of the IIa family.

8. The variable-focal length lens according to claim 7, wherein sides of the electrodes of the incident surface that oppose each other across the portion of the incident surface are arranged in parallel, and sides of the electrodes of the exit surface that oppose each other across the portion of the exit surface are arranged in parallel.

9. The variable-focal length lens according to claim 7, wherein the added impurity comprises lithium.

10. The variable-focal length lens according to claim 6, wherein the electrodes of the incident surface and the electrodes of the exit surface are made up of a material that forms the Schottky junction with the electrooptic material.

11. The variable-focal length lens according to claim 6, wherein sides of the electrodes of the incident surface that oppose each other across the portion of the incident surface are arranged in parallel, and sides of the electrodes of the exit surface that oppose each other across the portion of the exit surface are arranged in parallel.

12. The variable-focal length lens according to claim 2, wherein the electrodes of the incident surface and the electrodes of the exit surface are made up of a material that forms the Schottky junction with the electrooptic material.

13. The variable-focal length lens according to claim 2, wherein sides of the electrodes of the incident surface that oppose each other across the portion of the incident surface are arranged in parallel, and sides of the electrodes of the exit surface that oppose each other across the portion of the exit surface are arranged in parallel.

14. The variable-focal length lens according to claim 1, wherein the electrodes of the incident surface and the electrodes of the exit surface are made up of a material that forms the Schottky junction with the electrooptic material.

15. The variable-focal length lens according to claim 1, wherein sides of the electrodes of the incident surface that oppose each other across the portion of the incident surface are arranged in parallel, and sides of the electrodes of the exit surface that oppose each other across the portion of the exit surface are arranged in parallel.

16. The variable-focal length lens according to claim 15, wherein the opposing sides of the electrodes of the incident surface and the opposing sides of the electrodes of the exit surface that oppose the electrodes of the incident surface sandwiching the electrooptic material are arranged in parallel, respectively.

17. The variable-focal length lens according to claim 15, wherein a ratio R=A/T of a spacing A between the sides of the electrodes of the incident surface that oppose each other across the portion of the incident surface and between the sides of the electrodes of the exit surface that oppose each other across the portion of the exit surface, and a thickness T of the electrooptic material is less than or equal to 1.5.

18. The variable-focal length lens according to claim 16, wherein the opposing sides of the electrodes of the incident surface and the opposing sides of the electrodes of the exit surface that oppose the electrodes of the incident surface sandwiching the electrooptic material are arranged at coinciding positions that sandwich the electrooptic material, respectively.

19. The variable-focal length lens according to claim 16, wherein a ratio R=A/T of a spacing A between the sides of the electrodes of the incident surface that oppose each other across the portion of the incident surface and between the sides of the electrodes of the exit surface that oppose each other across the portion of the exit surface, and a thickness T of the electrooptic material is less than or equal to 1.5.

20. The variable-focal length lens according to claim 18, wherein a ratio R=A/T of a spacing A between the sides of the electrodes of the incident surface that oppose each other across the portion of the incident surface and between the sides of the electrodes of the exit surface that oppose each other across the portion of the exit surface, and a thickness T of the electrooptic material is less than or equal to 1.5.

* * * * *